United States Patent [19]

Yoshida

[11] Patent Number: 5,561,533
[45] Date of Patent: Oct. 1, 1996

[54] DATA COMMUNICATION APPARATUS HAVING A MULTI-ADDRESS TRANSMISSION FUNCTION

[75] Inventor: Takehiro Yoshida, Tokyo, Japan

[73] Assignee: Canon Kabushiki Kaisha, Tokyo, Japan

[21] Appl. No.: 13,104

[22] Filed: Feb. 3, 1993

[30] Foreign Application Priority Data

Feb. 5, 1992 [JP] Japan ................................. 4-054281

[51] Int. Cl.⁶ ............................ H04N 1/00; H04M 11/00
[52] U.S. Cl. ...................... 358/440; 358/400; 358/402; 358/434; 358/435; 379/100
[58] Field of Search ..................... 358/400, 402, 358/434, 435, 436, 438, 440, 439; 379/100; 395/200; 364/241.7, 919.1; H04N 1/00; H04M 11/00

[56] References Cited

U.S. PATENT DOCUMENTS

| | | | |
|---|---|---|---|
| 4,646,160 | 2/1987 | Iizuka et al. ............................ | 379/100 |
| 4,772,955 | 9/1988 | Kurahayashi et al. | |
| 5,001,572 | 3/1991 | Hashimoto et al. ..................... | 358/440 |
| 5,125,075 | 6/1992 | Goodale et al. ........................ | 395/200 |
| 5,134,502 | 7/1992 | Nakatsuma .............................. | 358/440 |
| 5,159,466 | 10/1992 | Haneda et al. .......................... | 358/434 |
| 5,196,843 | 3/1993 | Yoshino . | |
| 5,339,156 | 8/1994 | Ishii ........................................ | 358/402 |
| 5,386,297 | 1/1995 | Tanaka et al. .......................... | 358/402 |
| 5,473,691 | 12/1995 | Menezes et al. ........................ | 358/440 |

FOREIGN PATENT DOCUMENTS

| | | | |
|---|---|---|---|
| 2-305138 | 12/1990 | Japan ........................... | H04M 11/00 |
| 5-219340 | 8/1993 | Japan ........................... | H04M 11/00 |
| 5-292281 | 11/1993 | Japan ........................... | H04M 11/00 |
| 2089619 | 6/1982 | United Kingdom ................. | 358/440 |

*Primary Examiner*—Kim Yen Vu
*Assistant Examiner*—Kimberly A. Williams
*Attorney, Agent, or Firm*—Fitzpatrick, Cella, Harper & Scinto

[57] ABSTRACT

A data communication apparatus having a function to transmit data to a plurality of addressees comprises a generation circuit for generating information representing the plurality of addressees, and an information transmitting circuit for transmitting the information generated by the generation circuit to each of the addressee.

15 Claims, 10 Drawing Sheets

THE FOLLOWING STATIONS ARE MULTI-ADDRESS CALLED.
      THE PLANNING DEPART.
      THE DEVELOPMENT DEPART.
      THE PROJECTING DEPART.
      THE ESTIMATION DEPART.
```

THANK YOU FOR YOUR HELP. ·········
```

DATA COMMUNICATION APPARATUS HAVING A MULTI-ADDRESS TRANSMISSION FUNCTION

BACKGROUND OF THE INVENTION

1. Field of the Invention

The present invention relates to a data communication apparatus having a multi-address transmission function.

2. Related Background Art

When multi-address transmission is to be effected in a prior art facsimile apparatus, image information of a document to be transmitted is read and stored in a memory, designated multi-address destination stations are sequentially called, and the image information stored in the memory is read out each time the line is connected to sequentially transmit the image information.

In a receiving station, the image information transmitted by the multi-address function is received in the same manner as that of a normal reception.

However, in the prior art, the receiving station cannot determine whether the received information is by multi-address transmission or by single address transmission. As a result, a receiving station may misunderstand that it has been transmitted to that station only in spite of the fact that the transmitting station transmitted in the multi-address transmission mode, considers that it should be transmitted to other stations as well, and transmits the document in duplicate to the stations to which the document has been transmitted by the original multi-address transmission mode.

The multi-address transmission function is disclosed in U.S. Pat. Nos. 4,772,955; 4,845,569 and 5,111,307 and U.S. patent application Ser. Nos. 387,981 filed on Aug. 1, 1989, 442,721 filed on Nov. 29, 1989 and 547,127 filed on Jul. 3, 1990, but there has been no proposal to solve the above problem.

SUMMARY OF THE INVENTION

It is an object of the present invention to improve a data communication apparatus to solve the above problem.

It is another object of the present invention to permit a receiving station to recognize other addressees of the multi-address transmission.

In order to achieve the above objects, in accordance with the present invention, a data communication apparatus having a multi-address transmission function is provided with means for transmitting information indicating all addressees of multi-address transmission to each address of the multi-address transmission.

Other objects of the present invention will be apparent from the following detailed description of the preferred embodiments and the accompanying drawings.

BRIEF DESCRIPTION OF THE DRAWINGS

FIGS. 6A and 6B show diagrams of an image output in the first embodiment,

DETAILED DESCRIPTION OF THE PREFERRED EMBODIMENTS

The preferred embodiments of the present invention are now described in detail with reference to the drawings. In the following embodiments, a facsimile apparatus having a multi-address calling function is described although the present invention is not limited to the facsimile apparatus but it is equally applicable to various data communication apparatus such as a telex and computer communication.

Figure 1:
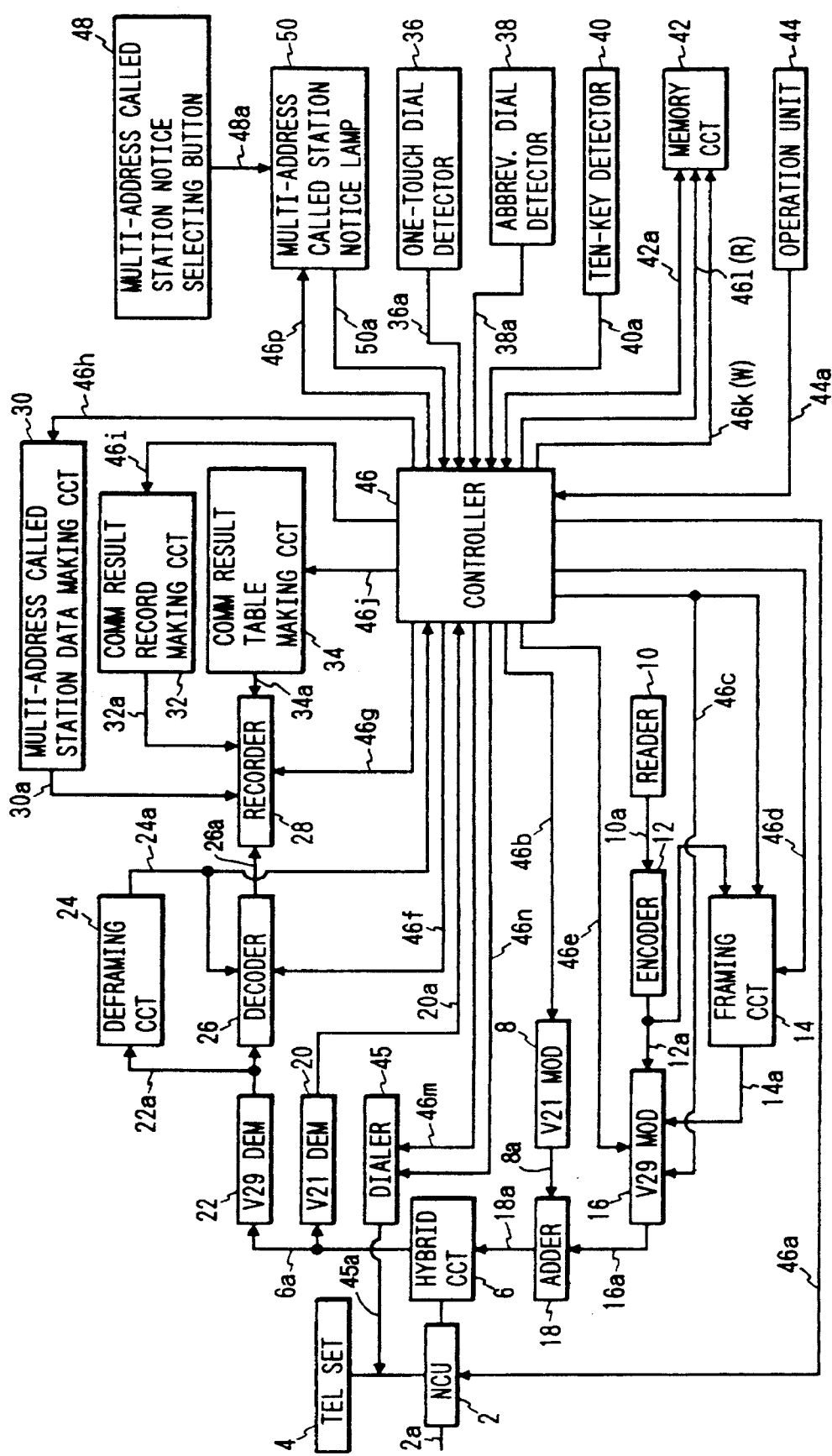
FIG. 1 shows a block diagram of a first embodiment of the present invention.
Figure 2:
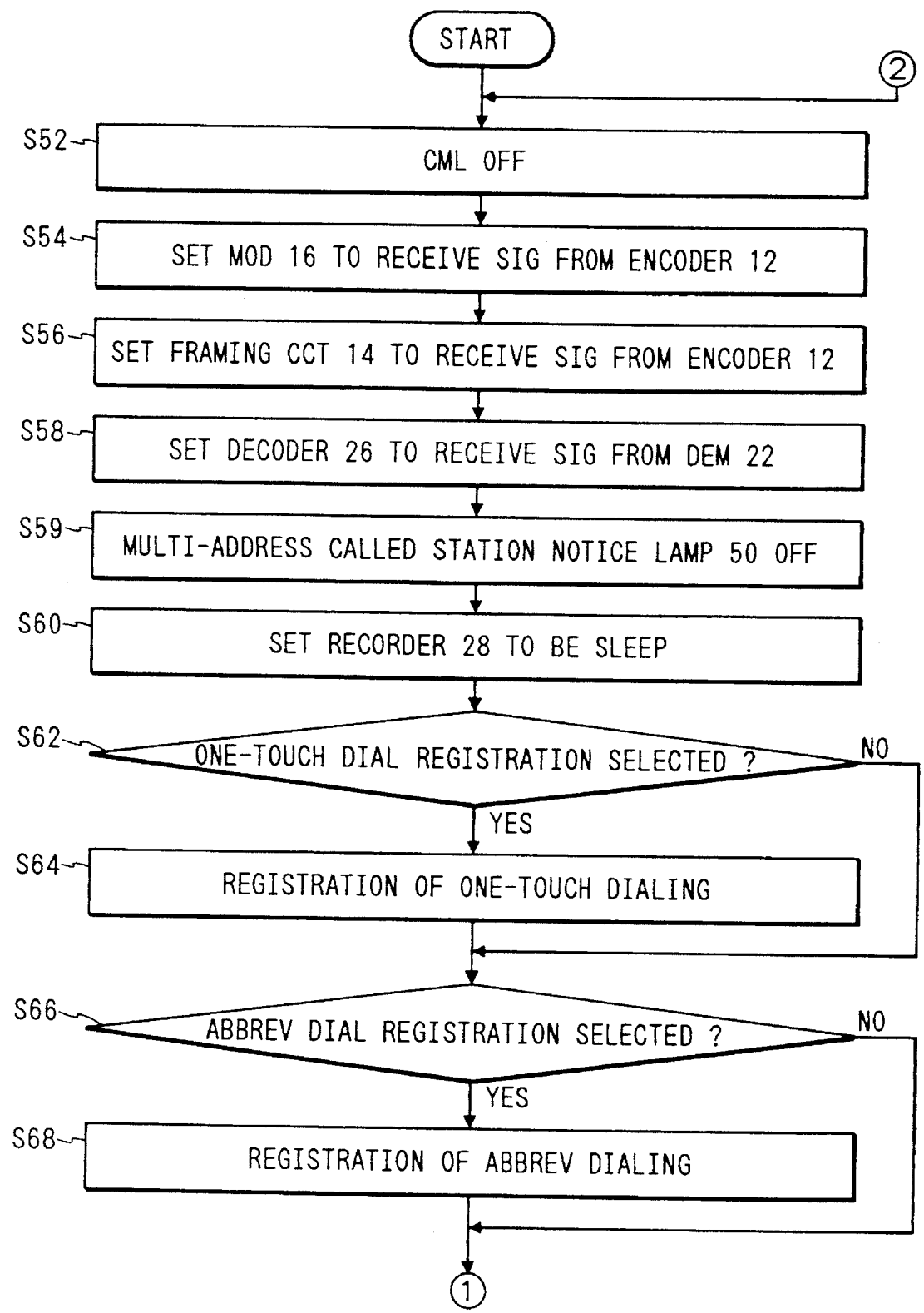
FIG. 2 shows a flow chart of an operation of the first embodiment.

FIG. 1 shows a block diagram of a configuration of a facsimile apparatus in accordance with a first embodiment of the present invention.

A network control unit (NCU) 2 is connected to a terminal of a line to use a telephone network for data communication, and controls the connection of the telephone network, switches it to a data communication path and retains a loop. When a signal level (signal line 46a) from a control circuit 46 is "0", the NCU 2 connects the telephone line 2a to a telephone set 4, and when the signal level is "1", it connects the telephone line 2a to the facsimile apparatus. In a normal state, the telephone line 2a is connected to the telephone set 4.

A hybrid circuit 6 separates a transmission signal and a reception signal, sends out a transmission signal from an adder circuit 18 to the telephone line 2a through the NCU 2, receives a signal from a destination station through the NCU 2 and sends it to a V29 demodulator 22 and a V21 demodulator 20 through the signal line 6a.

A V21 modulator 8 modulates in accordance with the known CCITT Recommendation V21. It modulates a protocol signal (signal line 46b) from the control circuit 46 and sends it out to an adder circuit 18 through a signal line 8a.

A read circuit 10 sequentially reads image signals along main scan lines, line by line, from a document to be transmitted to prepare a signal train representing white and black binary values. It comprises an image pickup device such as CCD (charge coupled devices) and an optical system. The signal train binarized by black and white is sent to an encoding circuit 12 from a signal line 10a.

The encoding circuit 12 encodes the read data (MH (Modified Huffman) encoding or MR (Modified READ) encoding) and sends it to a framing circuit 14 and a modulator 16 from a signal line 12a.

When a signal level of a signal line 46d from the control circuit 46 is "0", the framing circuit 14 receives the encoded data sent to the signal line 12a to effect the HDLC (high level data link control) framing, and when the signal level of the signal line 46d from the control circuit 46 is "1", it receives multi-address calling addressee data sent to the signal line 46c and effects the HDLC framing.

The HDLC framing comprises a flag (one byte), an address (one byte), a control (one byte), an FCF (facsimile control field) (one byte), a frame number (two bytes), image data (256 bytes), an FCS (frame checking sequence) (two bytes), and a flag (one byte). Whether the frame constitutes data of the multi-address calling destination or image data is designated by the FCF.

A V27ter or V29 modulator 16 modulates in accordance with the known CCITT Recommmendation V27ter (differential phase modulation) or V29 (quadrature modulation). When a signal level of a signal line 46e from the control circuit 46 is "0", the modulator 16 receives the data sent to the signal line 12a of the encoding circuit 12, and when the signal level of the signal line 46e is "1", it receives the data sent to the signal line 14a of the framing circuit 14, and when the signal level of the signal line 46e is "2", it receives the data sent to the signal line 46c of the control circuit 46. It modulates the respective input data. The modulated data from the modulator 16 is sent to the adder circuit 18 through the signal line 16a.

The adder circuit 18 adds the outputs of the modulators 8 and 16. The output of the adder circuit 18 is sent to the hybrid circuit 6.

The V21 demodulator 20 demodulates in accordance with the known CCITT Recommendation V21. The demodulator 20 receives a protocol signal from the hybrid circuit 6 through the signal line 6a, V21-demodulates it and sends the demodulated data to the control circuit 46 through the signal line 20a.

The V27ter or V29 demodulator 22 demodulates in accordance with the known CCITT Recommendation V27ter or V29. The demodulator 22 receives a modulated image signal from the hybrid circuit 6, demodulates it, and sends the demodulated data to a deframing circuit 24 and a decoding circuit 26 through a signal line 22a.

The deframing circuit 24 deframes the HDLC framed data received from the signal line 22a of the demodulator 22. The output signal of the deframing circuit 24 is sent to the control circuit 46 and the decoding circuit 26 through the signal line 24a.

When the signal level of the signal line 46f from the control circuit 46 is "0", the decoding circuit 26 receives the data from the demodulator 22, and when the signal level of the signal line 46f is "1", it receives the data from the deframing circuit 24 and decodes (MH decoding or MR decoding) it. The decoded data is sent to a record circuit 28 through a signal line 26a.

The record circuit 28 sequentially records the decoded black and white signals sent from the decoding circuit 26, line by line. When the signal level of the signal line 46g from the control circuit 46 is "0", the record circuit 28 is inactive, and when the signal level of the signal line 46g is "1", it receives the output (signal line 26a) from the decoding circuit 26 and records it. When the signal level of the signal line 46g is "2" it receives the output (signal line 30a) from a multi-address called station data making circuit (or multi-address transmission addressee generation circuit) 30 and records the multi-address transmission addressees, and when the signal level of the signal line 46g is "3", it receives the output (signal line 32a) from a communication result record making circuit 32 and records a communication result report, and when the signal level of the signal line 46g is "4", it receives the output (signal line 34a) from a communication result table making circuit 34 and records a communication result summary sheet.

The multi-address called station data making circuit 30 receives the multi-address transmission addressee information sent from the control circuit 46 to the signal line 46h, converts it to dot information and sends it to the signal line 30a.

The communication result record making circuit 32 receives the communication result report information sent from the control circuit 46 to the signal line 46i, converts it to dot information and sends it to the signal line 32a.

The communication result record making circuit 34 receives the communication result summary sheet information sent from the control circuit 46 to the signal line 46j, converts it to dot information and sends it to the signal line 34a.

A one-touch dialing button depression detection circuit 36 detects the depression of a one-touch dialing button. When the one-touch dialing button is depressed, it sends the information corresponding to the depressed button to the control circuit 46 through the signal line 36a.

An abbreviated dialing button depression detection circuit 38 detects the depression of an abbreviated dialing button. When the abbreviated dialing button is depressed, it sends the information corresponding to the depressed button to the control circuit 46 through the signal line 38a.

A ten-key depression detection circuit 40 detects the entry of two-digit abbreviated number by the ten-key following to the depression of the abbreviated dialing button or the dialing input by the depression of only the ten-key. When the ten-key is depressed, it sends the information corresponding to the depressed ten-key to the control circuit 46 through the signal line 40a.

A memory circuit 42 stores the information of the one-touch dialing and the abbreviated dialing. The memory circuit 42 can store the one-touch dialings from "01" to "36" and the abbreviated dialings from "00" to "99". When the one-touch dialing information is to be stored in the memory circuit 42, two-digit numerals (00–36) following a numeral 0 are sent from control circuit 46 to the signal line 42a, a telephone number corresponding to the one-touch dial number is sent, and a write pulse is sent to the signal line 46k. For the abbreviated dialing, two-digit numerals (00–99) following a numeral 1 are sent from the control circuit 46 to the signal line 42a, a telephone number corresponding to the abbreviated number is sent, and a write pulse is sent to the signal line 46k.

When the one-touch dialing information stored in the memory circuit 42 is to be read, two-digit numerals (00–36) following a numeral 0 are sent from the control circuit 46 to the signal line 42a and a read pulse is sent to the signal line 46l. For the abbreviated dialing, two-digit numerals (00–99) following a numeral 1 are sent from the control circuit 46 to the signal line 42a and a read pulse is sent to the signal line 46l. Thus, the memory circuit 42 sends the telephone number corresponding to the input two-digit number to the signal line 42a.

An operation unit (console unit) 44 is provided with a communication result summary sheet output button, a one-touch dial registration cancel button, an abbreviated dialing registration cancel button and a start button. When each button is depressed, it sends the information corresponding to the depressed button to the control circuit 46 through the signal line 44a.

A dialer 45 receives the telephone number sent to the signal line 46m when a call request pulse is sent from the control circuit 46 to the signal line 46n, and sends a selection signal to the addressee through the signal line 45a.

The control circuit 46 controls the overall facsimile apparatus and comprises a microcomputer and peripheral equipments such as a ROM and a RAM.

A multi-address called station notice selecting button 48 is used to select a mode for noticing which of the multi-address addressees have been selected. When the button is depressed, a pulse signal is sent to a multi-address called station notice lamp 50 through the signal line 48a.

The multi-address called station notice lamp 50 indicates which of multi-address addressees have been selected. It is turned off by a clear pulse (signal line 46p) from the control circuit 46, and thereafter repeats the turn-on and the turn-off each time the pulse signal is sent by the depression of the multi-address called station notice selecting button 48. During the turn-on of the multi-address called station notice lamp 50, a signal level "1" is sent to the control circuit 46 from the signal line 50a to allow the transmission of the multi-address addressee summary sheet to the receiving stations. During the turn-off of the multi-address called station notice lamp 50, a signal level "0" is sent to the control circuit 46 from the signal line 50a to inhibit the transmission of the multi-address addressee summary sheet to the non-selected receiving stations addresses.

FIGS. 2 to 5 show flow charts of control operations of the control circuit 46 in the present embodiment.

A signal level "0" is supplied from the control circuit 46 to the signal line 46a to turn off the CML (S52). A signal level "0" is supplied to the signal line 46e to send a status that the modulator 16 receives the signal of the encoding circuit 12 (signal line 12a) (S54), a signal level "0" is supplied to the signal line 46d to set a status that the framing circuit 14 receives the signal of the encoding circuit 12 (signal line 12a) (S56), and a signal level "0" is supplied to the signal line 46f to set a status that the decoding circuit 26 receives the signal of the demodulator 22 (signal line 22a) (S58).

The control circuit 46 supplies a clear pulse to the signal line 46p to turn off the multi-address called station notice lamp 50 (S59), and supplies a signal level "0" to the signal line 46g to set the recording circuit 28 inactive (S60).

When the registration of the one-touch dial is selected (S62), the registration process of the one-touch dial is carried out (S64).

When the registration of the abbreviated dial is selected (S66), the registration process of the abbreviated dial is carried out (S68).

Whether the transmission has been selected or not is monitored (S70), and if it has been selected, whether the multi-address transmission has been selected or not, or more particularly whether a plurality of destinations have been designated by the one-touch dial, the abbreviated dial or the ten-key or not is determined (S72), and if the multi-address transmission has been selected, the signal on the signal line 50a is received to determine whether the multi-address addressee notice is made or not (S731). If the multi-address addressee notice mode has not been selected, a normal multi-address transmission is made (S732) and then the process returns to an initial state (S52).

If the multi-address addressee notice mode has been selected, the process proceeds to S94 to be described later.

If the multi-address calling (or multi-address transmission) has not been selected in S72, the signal level of the signal line 46a from the control circuit 46 is set to "1" to turn on the CML (S74), and after the pre-procedure (or pre-protocol) (S76), the image is transmitted starting from the first line (S78) followed by the post-procedure (or post-protocol) (S80). Then, the process returns to the initial state (S52).

If the multi-address addressee notice mode has been selected in S731, the signal from the one-touch dialing button depression detection circuit 36, the abbreviated dialing button depression detection circuit 38 or the ten-key depression detection circuit 40 is received and the multi-address called stations (or multi-address destinations) are sequentially read (S94) to generate image data of the multi-address transmission addressee summary sheet (S96). It is transmitted to each destination as a front page with a page number 0.

Then, a call is made to the multi-address transmission destination by the calling circuit 45 (S98). If the destination station is not busy (S100), the signal level of the signal line 46a from the control line 46 is set to "1" to turn on the CML (S102), and after the pre-procedure (S104), the image is transmitted (S106). A signal level "2" is supplied to the signal line 46e to transmit the multi-address transmission addressee summary sheet as the page number 0, and then a signal level "0" is supplied to the signal line 46e to transmit the image of the document to be transmitted sequentially from the page 1. FIG. 6 shows an example of the image to be transmitted. As shown, the multi-address transmission addressee summary sheet is transmitted with the page number P0, and the image of the document to be transmitted is transmitted sequentially starting from the page number P1.

After the post-procedure (S108), the CML is turned off (S110), and if there remains a next multi-address transmission destination (S112), the process returns to S98 after 20-seconds interval (S114) and repeats the multi-address transmission process. If there is no other multi-address transmission destination (S112), the multi-address transmission process is terminated and the process returns to the initial state (S52).

If the destination station is busy in S100, the call is made three times to the destination and if there is no response (S116), whether there remains other multi-address transmission destination or not is checked (S122). If it remains, the process returns to S98 after 20-seconds interval (S114) and repeats the multi-address transmission process. If there is no other multi-address transmission destination (S124), the process returns to S98 after two-minutes interval and repeats the multi-address transmission process.

When the call is made three times to the busy destination station in S116, the fact that the multi-address transmission has not been attained for that destination is stored (S118), and whether there remains other multi-address transmission destination or not is checked (S120). If it remains, the process returns to S98 after 20-seconds interval and repeats the multi-address transmission process. If there is no other destination (S120), the multi-address transmission process is terminated and the process returns to the initial state (S52).

When the transmission is not selected in S70 and the reception is selected in S82, the signal level of the signal line 46a from the control circuit 46 is set to "1" to turn on the CML (S84), and after the pre-protocol (S86), the mode of the recording circuit 28 is set to receive the signal from the decoding circuit 26 (S87), the image is received (S88), the post-protocol is carried out (S90), and the process returns to the initial state (S52).

When the transmission is not selected in S70 and the reception is not selected in S82, other process is carried out (S92).

In the present embodiment, the multi-address transmission addressee summary sheet is numbered as page 0 and the image of the document to be transmitted is numbered as pages 1 et seq. although the numbering of pages is not limited to the above.

In the present embodiment, the multi-address transmission addressee summary sheet is transmitted as image information and it is received at the receiving station as an ordinary image. Alternatively, the multi-address transmission addressees may be noticed by code information.

Figure 7A:
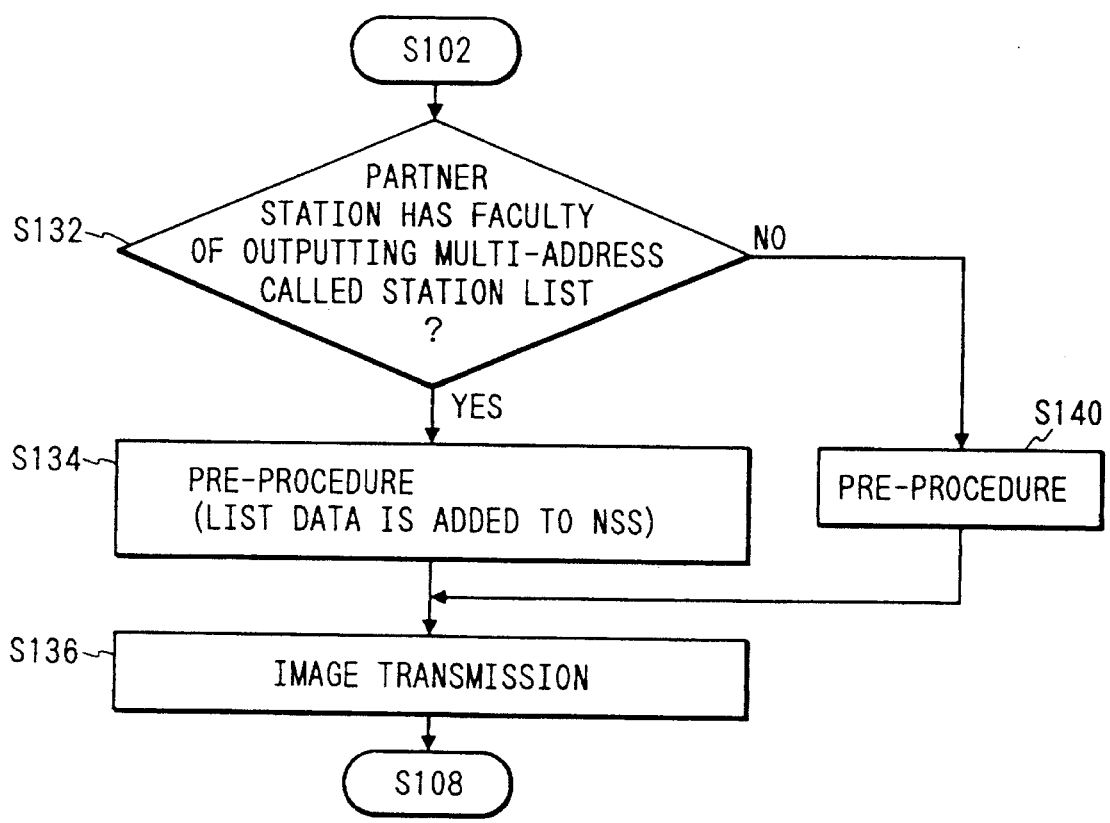
FIGS. 7A and 7B show flow charts of an operation of a second embodiment of the present invention.
Figure 7B:
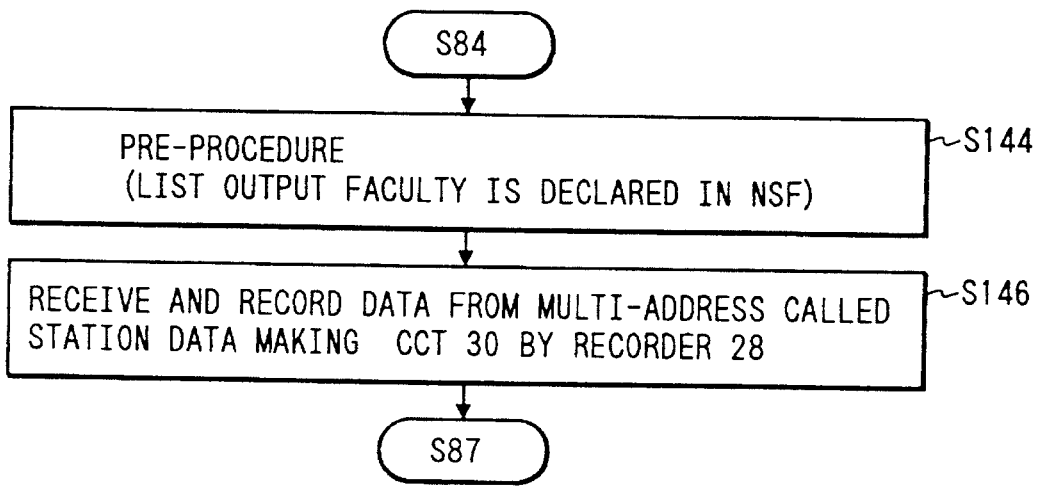

FIGS. 7A and 7B show flow charts of an operation when the multi-address transmission addressees are noticed by code information by a protocol signal. FIGS. 7A and 7B show only those portions which differ from FIGS. 2–5.

Figure 4:
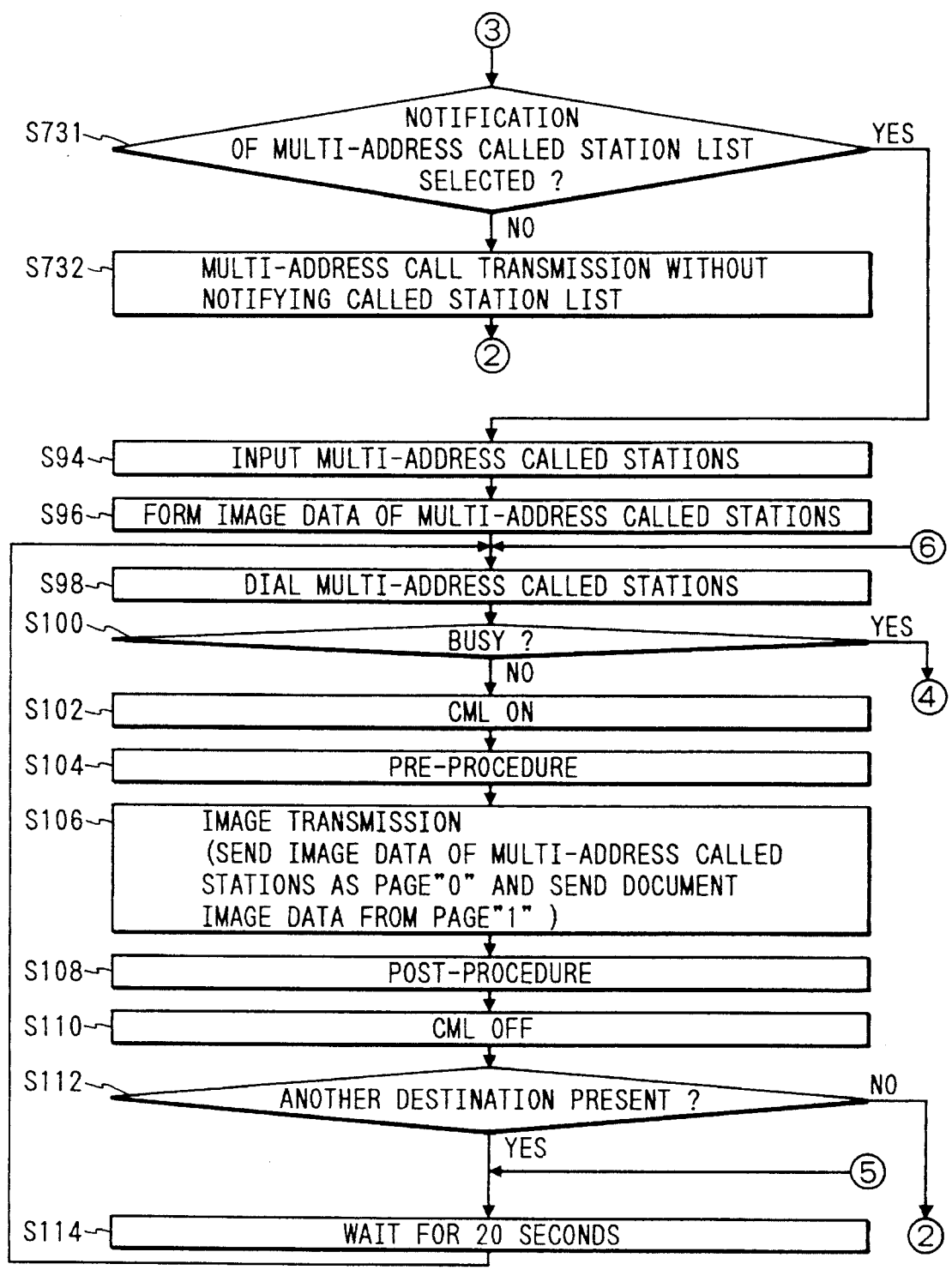
FIG. 4 shows a flow chart of an operation of the first embodiment.
Figure 5:
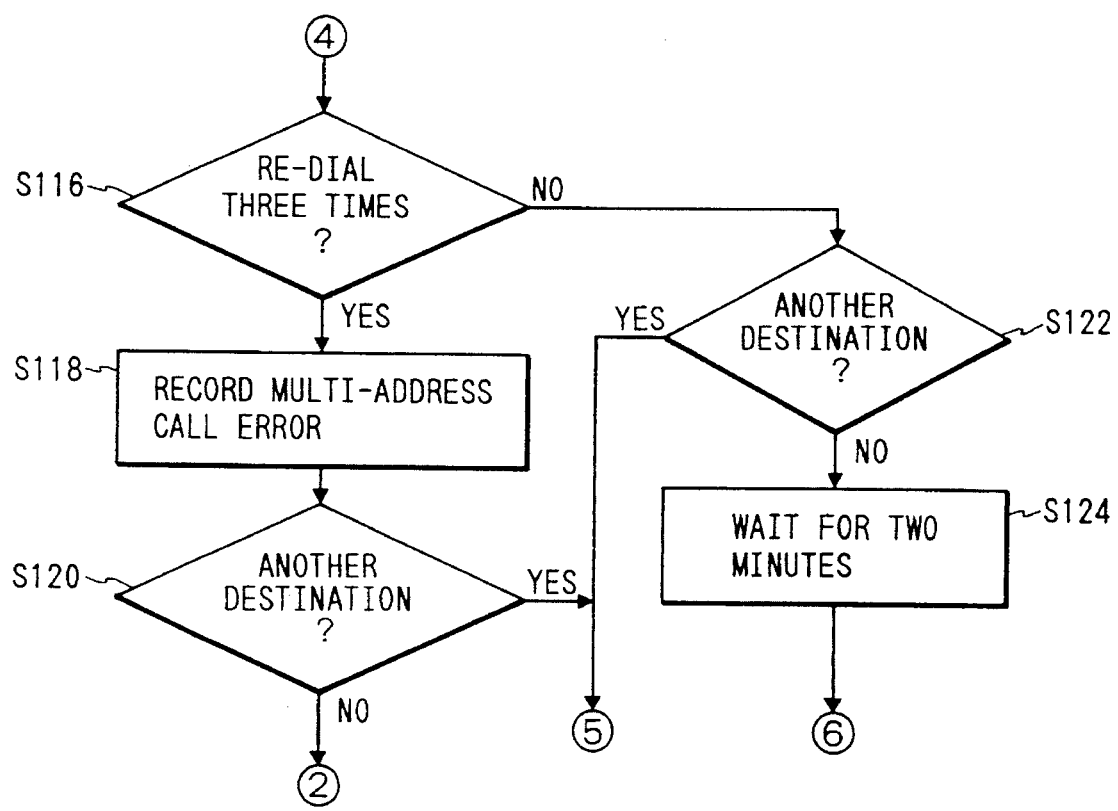
FIG. 5 shows a flow chart of an operation of the first embodiment.

The CML is turned on in S102 of FIG. 4, and in the pre-protocol, whether the destination station has a function to output the multi-address transmission addressee summary sheet or not is determined (S132). If it has, the code information (user abbreviations and telephone numbers) of the multi-address transmission addressee summary sheet is included in the NSS and it is transmitted (S134). The image is then transmitted (S136) and the process returns to S108 of FIG. 4.

If the destination station does not have a function to output the multi-address transmission addressee summary sheet, the image is transmitted (S136) by the normal pre-procedure (S140).

Figure 3:
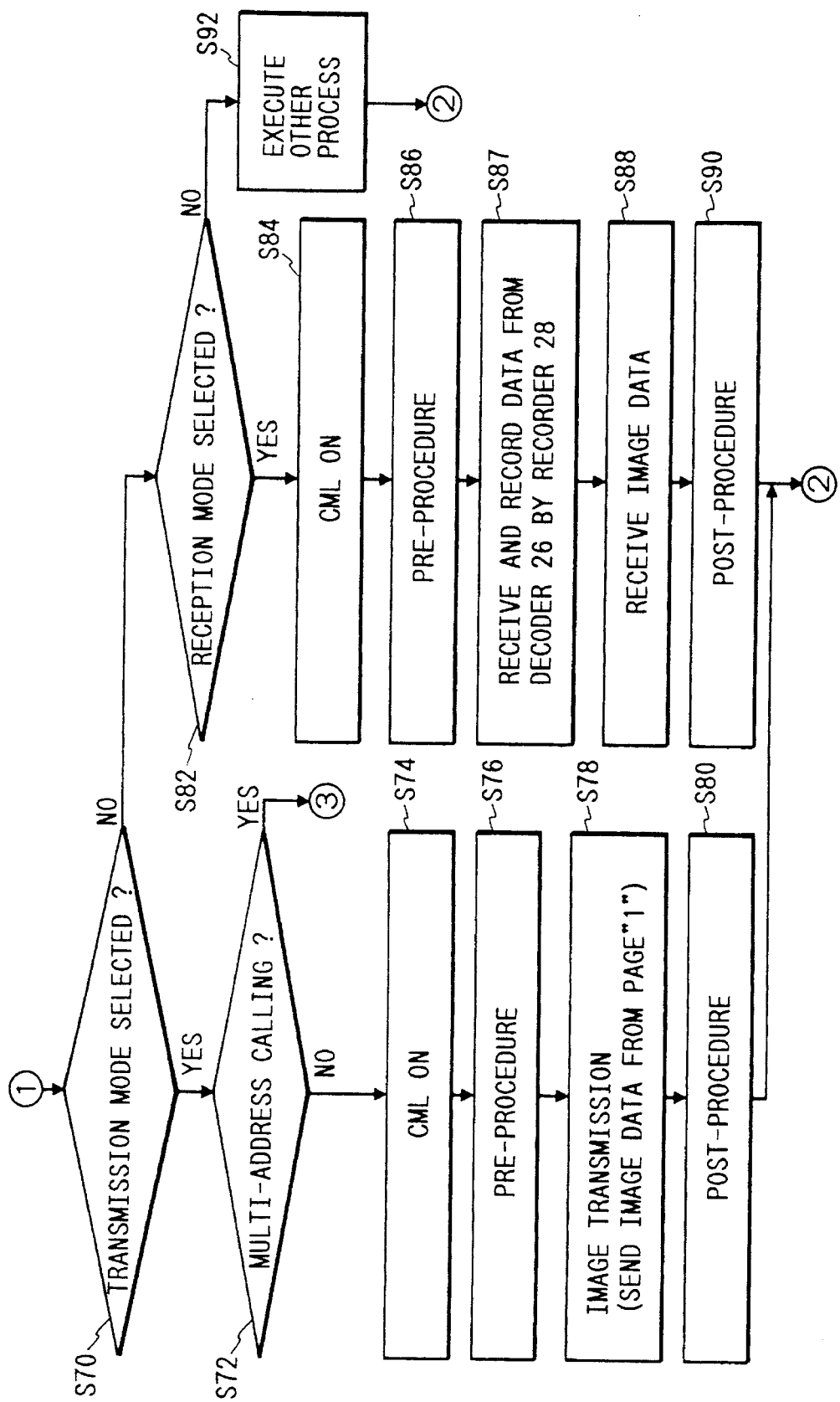
FIG. 3 shows a flow chart of an operation of the first embodiment.

Then, the CML is turned on in S84 of FIG. 3, and in the pre-protocol, the fact that its own station has a function to output the multi-address transmission addressee summary sheet is declared (S144). The recording circuit 28 is set to receive the data from the multi-address called station data making circuit 30 which outputs the multi-address addressee summary sheet converted from the code information to the image information (S146). Then, the process proceeds to S87 of FIG. 3.

In the present embodiment, the multi-address addressee summary sheet is outputted together with the received image of document, although it may be outputted later as a communication management report separately from the received image of document.

Figure 8A:
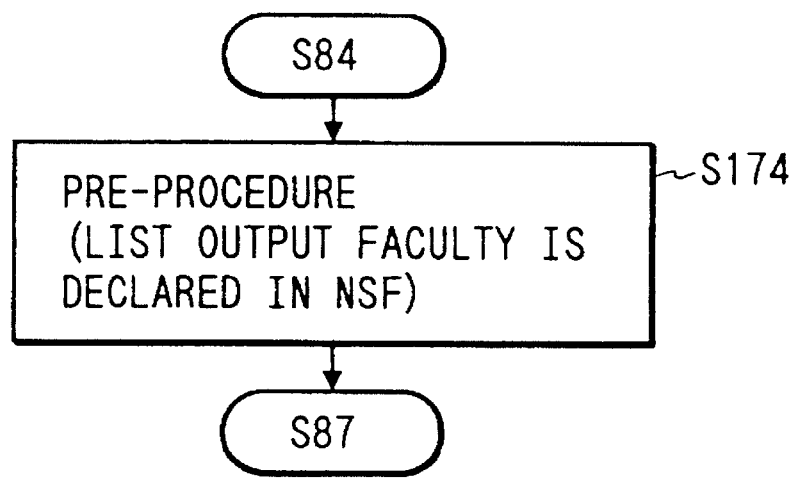
FIGS. 8A and 8B show flow charts of an operation of a third embodiment of the present invention.
Figure 8B:
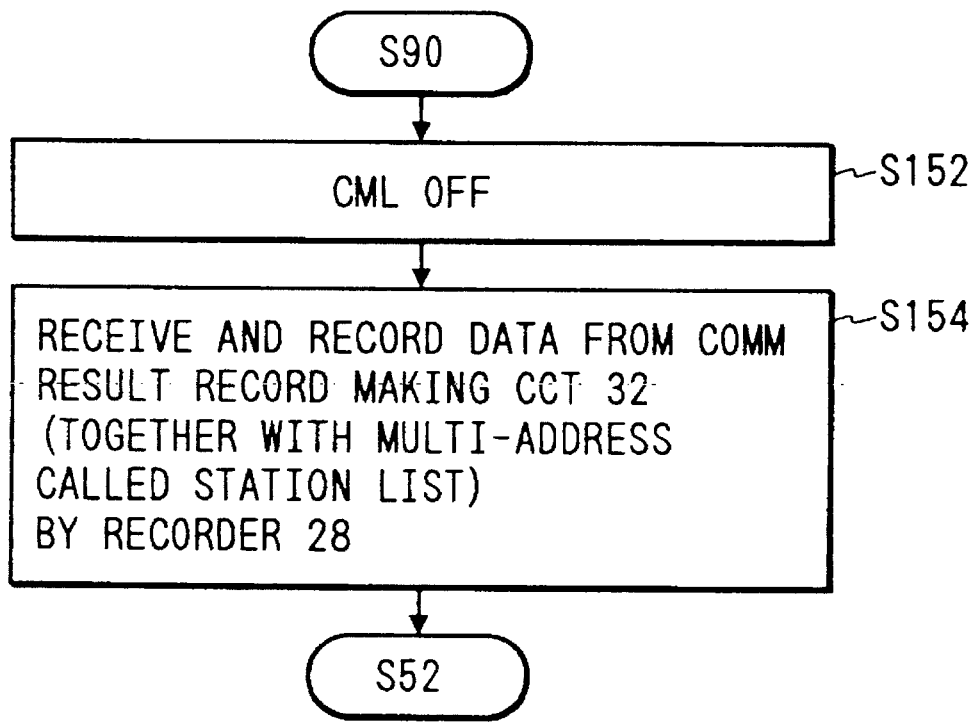

FIGS. 8A and 8B show flow charts of an operation to output the multi-address addressee summary sheet as a communication management report after the output of the received image of document. FIGS. 8A and 8B show only those portions which differ from FIGS. 2–5.

The CML is turned on in S84 of FIG. 3. In the pre-procedure, the fact that its own station has a function to output the multi-address addressee summary sheet is declared (S174), but the multi-address addressee summary sheet is not outputted. The process then proceeds to S87 of FIG. 3.

The post-procedure is carried out in S90 of FIG. 3 and the CML is turned off (S152). Thus, the recording circuit 28 is set to receive the data from the communication result record making circuit 32 and it outputs the communication result report generated by the record making circuit 32 (S154). The communication result report includes the multi-address addressee summary sheet generated by the communication result summary sheet table circuit 34. Then, the process proceeds to the initial state (S52) of FIG. 2.

The code information of the multi-address addressee summary sheet may be included in a portion of the HDLC framed image signal.

Figure 9:
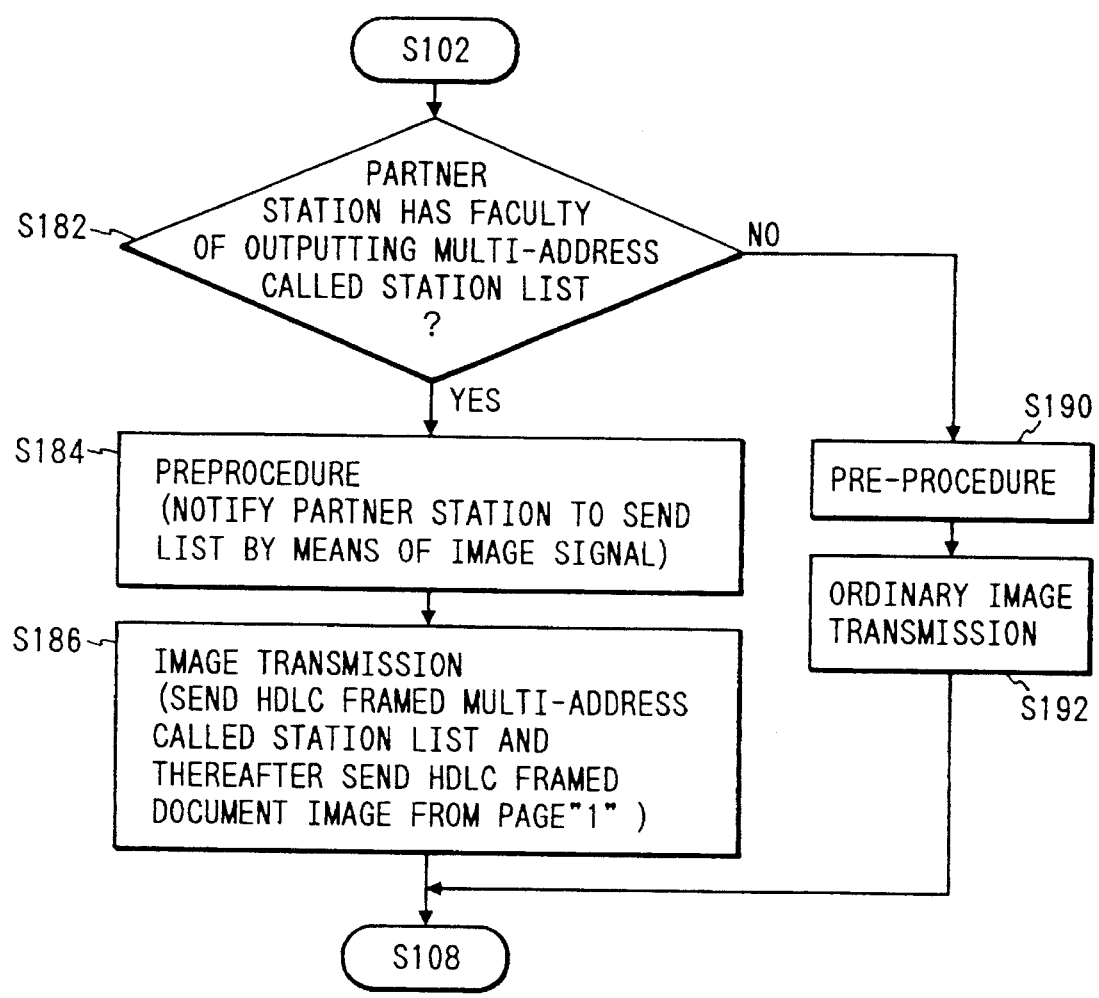
FIG. 9 shows a flow chart of an operation of a fourth embodiment of the present invention.
Figure 10:
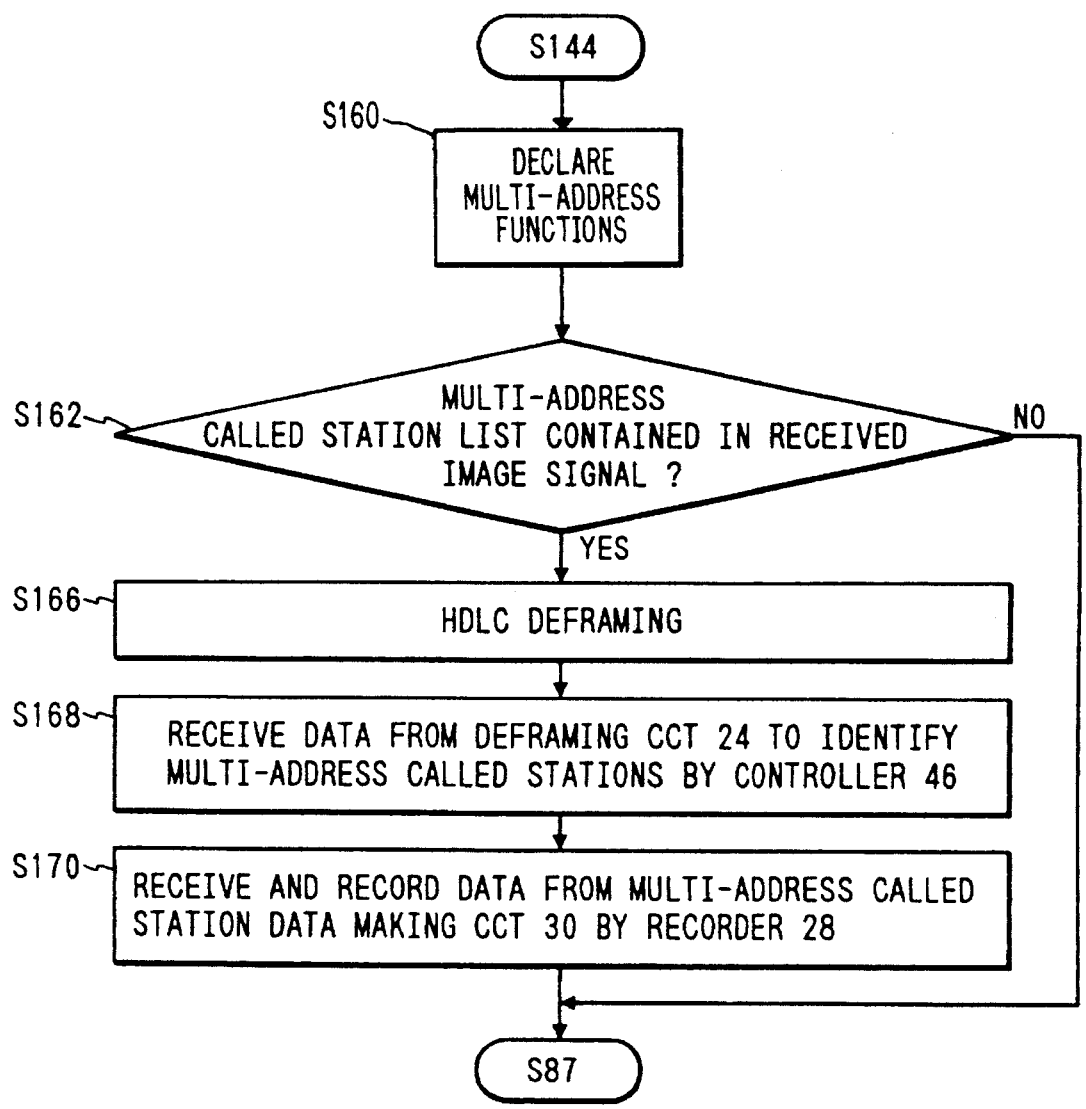
FIG. 10 shows a flow chart of an operation of the fourth embodiment.

FIGS. 9 and 10 show flow charts for the above operation. FIGS. 9 and 10 show only those portions which differ from FIGS. 2–5.

In FIG. 9, the CML is turned on in S102 of FIG. 4, and in the pre-protocol, whether the destination station has a function to output the multi-address addressee summary sheet or not is determined (S182). If it has, the transmission of the multi-address addressee summary sheet by an image signal is noticed to the destination station (S184).

The control circuit 46 supplies a signal level "1" to the signal line 46e, and the modulator 16 is set to receive the signal of the signal line 14a. A signal level "1" is supplied to the signal line 46d, and the framing circuit 14 receives the signal of the signal line 46c and transmits the HDLC framed multi-address addressee summary sheet prior to the transmission of the document image. Then, a signal level "0" is supplied to the signal line 46d, and the framing circuit 14 receives the signal of the signal line 12a and transmits the document image by HDLC framing (S186). Then, the process returns to S108 of FIG. 4.

When the destination station does not have a function to output the multi-address addressee summary sheet, the normal image transmission is carried out (S192) by the normal pre-procedure (S190).

In FIG. 10, the CML is turned on in S84 of FIG. 3. In the pre-procedure, the fact that its own station has a function to output the multi-address addressee summary sheet is declared in the NSF (S160), and whether the multi-address addressee summary sheet is included in the received image information or not is determined (S162). If it is not included, the process proceeds to S87 of FIG. 3.

If it is included, the received image is HDLC-deframed by the deframing circuit 24 (S166). The control circuit 46 receives the signal of the signal line 24a, recognizes the multi-address transmission destinations (S168), and supplies a signal level "2" to the signal line 46g so that the recording circuit 28 is set to receive the data from the multi-address called station data making circuit 30 and outputs the multi-address addressee summary sheet generated by the multi-address called station data making circuit 30 (S170). Then, the process proceeds to S87 of FIG. 3.

In the reception of the multi-address communication, it may be recorded in the communication result summary sheet.

In accordance with the present invention, the receiving station is informed of other destination stations of the multi-address communication and can effectively take necessary measure such as decision as to a destination of transmission.

The present invention is not limited to the above embodiments but various modifications thereof may be made.

What is claimed is:

1. A facsimile data communication apparatus having a function of transmitting image data to a plurality of addressees, comprising:

means for generating code data representing the plurality of addressees;

protocol signal communication means for communicating protocol signals for standardized facsimile communication;

code transmission means for transmitting the code data to each of the addressees;

image transmission means for transmitting the image data to each of the addressees; and control means, operative for each one of the addressees, for discriminating, in accordance with a first protocol signal received from the one addressee by the protocol signal communication means, whether or not the one addressee has a function of receiving the code data and for causing said code transmission means to transmit the code data representing at least one other of the addressees to the one addressee in accordance with a result of the discrimination.

2. An apparatus according to claim 1, wherein said code transmission means transmits the code data as a second protocol signal.

3. An apparatus according to claim 2, wherein said code transmission means sets the code data into the second protocol signal to be transmitted by said protocol signal communication means.

4. An apparatus according to claim 1, further comprising selection means for selecting whether to transmit the code data or not.

5. An apparatus according to claim 1, wherein said image transmission means transmits to the one addressee the information generated by said generation means representing all other of the addressees.

6. A facsimile transmission method for transmitting image data to a plurality of addressees, comprising the steps of:

generating code data representing the plurality of addressees;

receiving a first protocol signal from each of the addressees, the first protocol signal indicating a function of the addressee and being a protocol signal in standardized facsimile communication;

discriminating, in accordance with the received first protocol signal, whether or not each of the addressees has a function of receiving the code data;

transmitting the code data representing at least one other of the addressees to each of the addressees in accordance with a result of the discrimination; and transmitting the image data to each of the addressees.

7. A method according to claim 6, wherein the code data is transmitted to each addressee as a second protocol signal in standardized facsimile communication.

8. An image data communication method according to claim 6, wherein each addressee converts the received code data to image data to output multi-address addressee summary sheet information.

9. A method according to claim 8, wherein the summary sheet information is outputted together with the received image data.

10. A method according to claim 9, wherein the summary sheet information is outputted as a communication result report.

11. A method according to claim 9, wherein reception by multi-address communication is indicated on the summary sheet information.

12. A method according to claim 6, wherein said transmitting step transmits to each of the addressees the information representing all others of the addressees.

13. A facsimile communication apparatus having a function of transmitting image data to a plurality of addressees, comprising:

means for generating code data representing the plurality of addressees;

receiving means for receiving a first protocol signal from each of the addressees in standardized facsimile communication;

protocol signal transmission means for transmitting the code data as a second protocol signal to each of the addressees;

image data transmission means for transmitting the image data to each of the addressees; and control means for discriminating, in accordance with the respective first protocol signal, whether or not each addressee has a function of receiving the code data and for causing said protocol signal transmission means to transmit the code data representing at least one other of the addressees as the second protocol signal to each addressee in accordance with a result of the discrimination.

14. A facsimile transmission method for transmitting image data to a plurality of addressees comprising the steps of:

generating code data representing the plurality of addressees;

receiving a first protocol signal from each of the addressees in standardized facsimile communication;

discriminating, in accordance with the respective received first protocol signal, whether or not each of the addressees has a function of receiving the code data;

transmitting the code data representing at least one other of the addressees as a second protocol signal in standardized facsimile communication to each of the addressees in accordance with a result of the discrimination; and transmitting the image data to each of the addressees.

15. A method according to claim 14, wherein each addressee converts the received code data to image data to output multi-address addressee summary sheet information.

* * * * *

UNITED STATES PATENT AND TRADEMARK OFFICE
CERTIFICATE OF CORRECTION

PATENT NO. : 5,561,533
DATED : October 1, 1996
INVENTOR(S) : TAKEHIRO YOSHIDA

It is certified that error appears in the above-identified patent and that said Letters Patent is hereby corrected as shown below:

Title page,
<u>AT [57] ABSTRACT</u>

Line 6, "addressee." should read --addressees.--.

<u>COLUMN 6</u>

Line 9, "calling circuit 45" should read --dialer 45--.

<u>COLUMN 9</u>

Line 31, "An image data communication" should read --A--.

Signed and Sealed this

Eleventh Day of March, 1997

Attest:

BRUCE LEHMAN

Attesting Officer   Commissioner of Patents and Trademarks